March 1, 1966 G. H. WELLS 3,238,310

BIDIRECTIONAL AMPLIFIERS

Filed Feb. 13, 1961 2 Sheets-Sheet 1

INVENTOR.
GEORGE H. WELLS
BY John V. Regan
Attorney

March 1, 1966 G. H. WELLS 3,238,310

BIDIRECTIONAL AMPLIFIERS

Filed Feb. 13, 1961 2 Sheets-Sheet 2

INVENTOR.
GEORGE H. WELLS
BY John V. Regan
Attorney 3,238,310
BIDIRECTIONAL AMPLIFIERS
George H. Wells, Westmont, N.J., assignor to Radio Corporation of America, a corporation of Delaware
Filed Feb. 13, 1961, Ser. No. 88,884
5 Claims. (Cl. 179—170)

The present invention relates to bidirectional amplifiers. While not restricted thereto, the amplifier of the invention is especially suitable for amplifying pulse type signals representative of binary digits.

A three electrode active element such as a transistor, vacuum tube or the like is suitable for amplifying a signal transmitted in one direction along a signal path. It may also be used for two-way transmission in a suitable circuit employing a relatively complex bridge circuit with separate amplifiers and gate circuits for each direction of amplification. Examples of such circuits may be found in the telephone transmission art, for example.

An object of the present invention is to provide an improved bidirectional amplifier.

Another object of the present invention is to provide a simple, compact, transistorized bidirectional amplifier.

Another object in the present invention is to provide a simple bidirectional amplifier which is turned on or off by the signal to be transmitted and which does not require separate gate circuits.

Another object of the invention is to provide an improved bidirectional amplifier, having current gain, for use with long transmission lines along which loads and drivers are distributed.

The amplifier of the invention includes a pair of active amplifier elements each of which has three electrodes, namely a control electrode, a charge carrier emitting electrode and a charge carrier collecting electrode. There is a direct connection between the emitting electrode of each active element and the control electrode of the other active element. A terminal is located at each direct connection to which an input signal may be applied and from which an output signal may be derived. The active elements may be transistors or tubes. When a signal of appropriate polarity is applied to one of the terminals, the amplifier transmits in one direction and is cut off in the opposite direction and when the signal is applied to the other of the terminals, the reverse occurs.

The invention is described in greater detail below and is illustrated in the following drawings, of which:

Similar reference numerals are applied to similar elements in the various figures.

Figure 1:
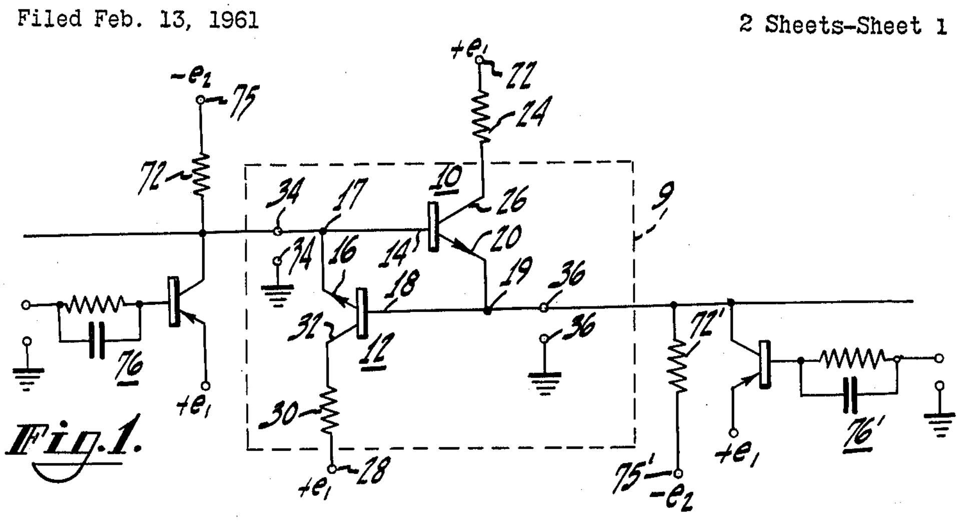
FIG. 1 is a schematic circuit diagram of a transistorized bidirectional amplifier according to the present invention.

The amplifier of the invention is shown in dashed block 9 in the circuit of FIG. 1 and includes two NPN transistors 10 and 12, respectively. The base 14 of transistor 10 is connected to the emitter 16 of transistor 12 and the base 18 of transistor 12 is connected to the emitter 20 of transistor 10. The supply voltage $+e_1$ is applied from terminal 22 through resistor 24 to the collector 26 of transistor 10 and from terminal 28 through resistor 30 to the collector 32. Terminals 22 and 28 may be a common terminal. The supply voltage $-e_1$ is applied from terminal 75 through load resistor 72 to the common emitter-base connection 17 and from terminal 75′ through load resistor 72′ to the common emitter base connection

19. As indicated in the figure, resistors 72 and 72′ may also be the load resistors for driver stages 76 and 76′. These stages are shown only in part in FIG. 1. A more detailed showing of a driver appears in FIG. 3.

The circuit of FIG. 1 is a bidirectional amplifier. To transmit a signal from left to right, as viewed in the figure, a positive input signal is applied from a stage such as 76 to common input-output terminals 34. In this case, the output appears at common input-output terminals 36. To transmit a signal in the opposite direction, a positive input signal is applied from a stage such as driver 76′ to terminals 36. Now the output appears at terminals 34. If the ungrounded ones of terminals 34 and 36 are both equally positive, both transistors are driven to cut off in view of the positive voltages applied to the emitters 16 and 20. If no signals are applied to the amplifier 9, both transistors are cut off by the negative voltage $-e_2$ applied to the bases of the transistors.

The circuit described above acts as an emitter follower and provides current gain in the desired direction. When a positive signal is applied to terminals 34 and no signal is applied to terminals 36, the emitter 16 of transistor 12 is reverse biased and the transistor 12 is cut off. The same positive signal at base 14 produces current flow and current amplification in transistor 10. In like manner, when a positive signal is applied to terminals 36 and no signal is applied to terminals 34, transistor 12 acts as an emitter follower and provides current gain, and transistor 10 is driven to cut off.

The circuit of FIG. 1 has a number of important advantages. It provides current gain in either direction without requiring gates. Fewer components are required than in other known transistor circuits which are capable of performing a similar function. Accordingly, the circuit is relatively inexpensive. Finally, the circuit has very low power dissipation and requires only one positive source voltage $+e_1$.

In the circuit of FIG. 1, the purpose of resistors 24 and 30 is to limit the current flow through the respective transistors 10 and 12 to which they are connected. Their value is not critical and may be from zero to perhaps 1000 ohms depending upon the particular circuit. Other typical values of circuit parameters for the circuit of FIG. 1 are:

Resistors 72 and 72′—1800 ohms
Transistors 10 and 12—2N1091
Voltage $e_1$—+6.5 volts
Voltage $-e_2$—−19.5 volts PNP transistors can be employed in the circuit of FIG. 1 rather than the NPN transistors shown. The circuit is otherwise the same except that a negative power supply voltage $-e_1$ and a positive power supply $+e_2$ are required and the drivers, in this case, are of NPN type.

Figures 2, 3:
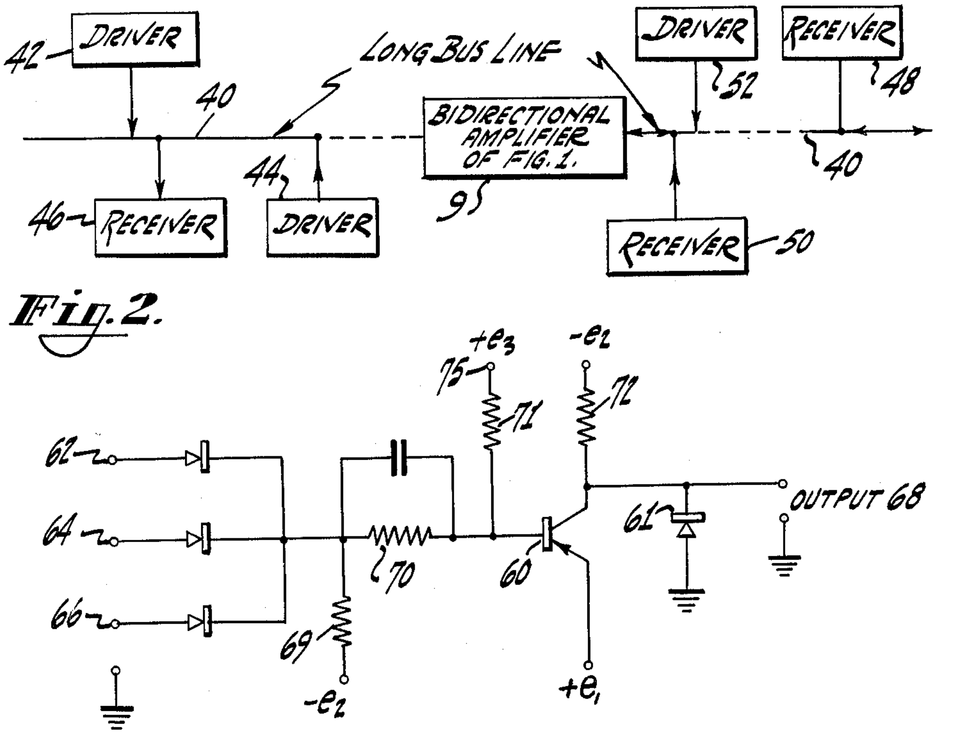
FIG. 2 is a block circuit diagram showing an application for the bidirectional amplifier of FIG. 1.
FIG. 3 is a schematic circuit diagram of a driver or receiver stage such as shown in block form in FIG. 2.

A circuit in a digital computer in which the amplifier of FIG. 1 is especially useful is shown in FIG. 2. Line 40 may be a long transmission line which is part of a bus which connects logic gates in various parts of the digital computer. Two drivers 42 and 44 and a receiver 46 are connected to the left end of the line. Two receivers 48 and 50 and a driver 52 are connected to the right end of the line. The drivers and receivers are selectively controlled by control pulses (not shown) applied to these circuits. These may cause a particular driver to apply an output signal to the line and a particular receiver to receive this signal from the line after transmission along the line. The bidirectional amplifier 9 which is shown in detail in FIG. 1 is connected near the center of the line and serves to amplify the transmitted signal.

A typical computer logic gate circuit which performs the driving and receiving function is shown in FIG. 3.

The circuit is a transistorized "none" or "nor" gate. A positive output voltage from this stage represents the binary digit "one" and no voltage output from the stage represents the binary digit "zero."

In operation, transistor 60 is cut-off when a positive voltage representing the binary digit "one" is applied to one or more of the terminals 62, 64, 66. When transistor 60 is cut off, its output is clamped to ground by diode 61. This represents the binary digit "zero." However, when all inputs represent the binary digit "zero" (all input diodes cut-off), the base of transistor 60 goes negative and the transistor is driven into heavy conduction. At this time, a positive voltage $+e_1$ representing the binary digit "one" appears at the output terminals 68.

Figure 4:
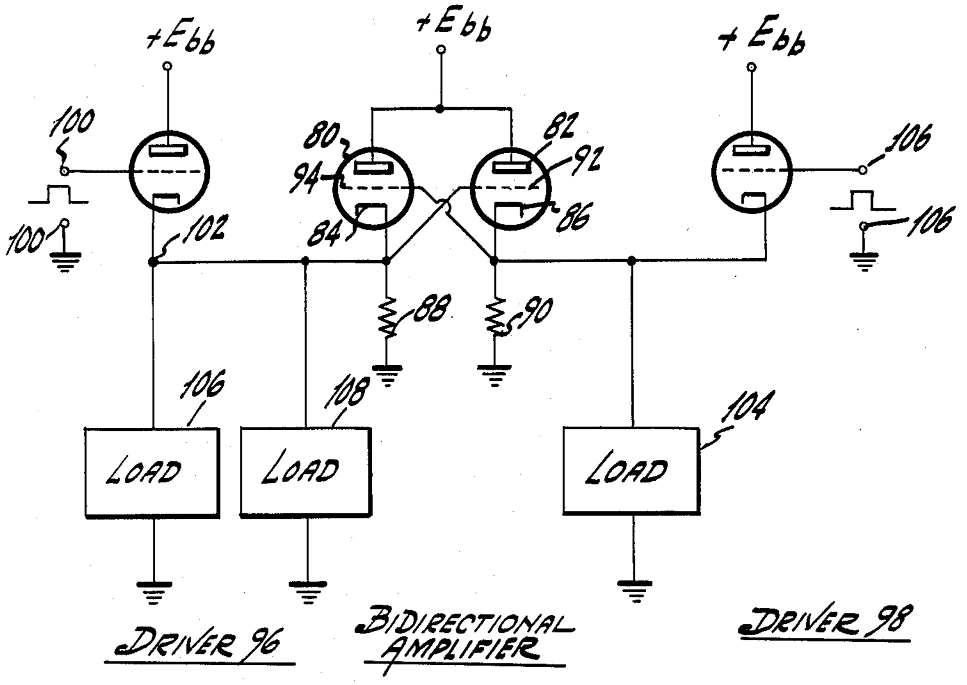
FIG. 4 is a schematic circuit diagram of a bidirectional amplifier according to the invention which employs vacuum tubes.

A typical circuit according to FIG. 3 may have the following circuit parameters:

Resistor 69—5600 ohms
Resistor 70—1800 ohms
Resistor 71—5100 ohms
Resistor 72—1800 ohms
$+e_1$—+6.5 volts
$-e_2$—−19.5 volts
$+e_3$—+13 volts The present invention is applicable to tubes as well as to transistors. A typical tube circuit bidirectional amplifier and two drivers are illustrated in FIG. 4. The bidirectional amplifier includes two cathode followers 80 and 82, the respective cathodes 84 and 86 of which are connected to ground through load resistors 88 and 90, respectively. Cathode 84 of cathode follower 80 is connected to the control grid 92 of cathode follower 82 and cathode 86 of cathode follower 82 is connected to the control grid 94 of cathode follower 80. The drivers 96 and 98 are also cathode followers. If voltage gain is needed, amplification may be provided by stages prior to the drivers.

The operation of the tube circuit of FIG. 4 is analogous to that of the transistorized circuit already discussed in detail. For example, if a positive signal is applied to input terminals 100, the positive pulse which results at cathode 102 causes cathode follower 82 to be driven into conduction and cathode follower 80 to be cut off. The positive output signal which results at cathode 86 may be applied to a load such as a receiver illustrated as block 104. In a similar manner, when a positive signal is applied to input terminals 106, cathode follower 80 is driven into conduction and cathode follower 82 is cut off. In this case, an output positive pulse appears at loads 106 and 108.

What is claimed is:

1. The combination, comprising:
a two-way transmission path at either end portion of which a signal may be applied for transmission along the path to the opposite end of the path; and
a bidirectional amplifier in said path for amplifying the signal passing in either direction along the path comprising:
  a pair of active amplifier elements, each including three electrodes, namely a control electrode, a charge carrier emitting electrode and a charge carrier collecting electrode;
  a bidirectional direct-current connection between the emitting electrode of each active element and the control electrode of the other active element;
  a terminal at each direct-current connection, one for receiving an input signal propagating along said path in one direction and the other for receiving an input signal propagating along said path in the opposite direction, each terminal for producing an output signal when the other terminal receives an input signal; and
  means coupled to each element for supplying an operating voltage to each element.

2. The combination, comprising:
a two-way transmission path at either end portion of which a signal may be applied for transmission along the path to the opposite end of the path;
a bidirectional amplifier in said path for amplifying the signal passing in either direction along the path comprising:
  a pair of transistors, each including three electrodes, namely a control electrode, a charge carrier emitting electrode and a charge carrier collecting electrode;
  a direct connection between the emitting electrode of each transistor and the control electrode of the other transistor;
  a terminal at each direct connection, one receiving an input signal when transmission occurs in one direction along the path and the other receiving an input signal when transmission occurs in the opposite direction along the path, each terminal for producing an output signal when the other terminal receives an input signal; and
  means coupled to each element for supplying an operating voltage to each element;
two driver transistors of opposite conductivity type to the bidirectional amplifier transistors, each connected to a different end portion of the transmission path; and
two receiver transistors of opposite conductivity type to the bidirectional amplifier transistors, each connected to a different end portion of the transmission path.

3. The combination, comprising:
a two-way transmission path at either end portion of which a signal may be applied for transmission along the path to the opposite end of the path; and
a bidirectional amplifier in said path for amplifying the signal passing in either direction along the path comprising:
  a pair of active amplifier elements, each comprising an electron discharge device and each including three electrodes, namely a control electrode, a charge carrier emitting electrode and a charge carrier collecting electrode;
  a direct connection between the emitting electrode of each active element and the control electrode of the other active element;
  a terminal at each direct connection, one for receiving an input signal propagating along said path in one direction and the other for receiving an input signal propagating along said path in the opposite direction, each terminal for producing an output signal when the other terminal receives an input signal; and
  means coupled to each element for supplying an operating voltage to each element.

4. The combination, comprising:
a two-way transmission path at either end portion of which a signal may be applied for transmission along the path to the opposite end of the path; and
a bidirectional amplifier in said path for amplifying the signal passing in either direction along the path comprising:
  a pair of active amplifier elements, each comprising a triode operating as a cathode follower, and each including three electrodes, namely a control electrode, a charge carrier emitting electrode and a charge carrier collecting electrode;
  a direct connection between the emitting electrode of each active element and the control electrode of the other active element;
  a terminal at each direct connection, one for receiving an input signal propagating along said path in one direction and the other for receiving an input signal propagating along said path in the opposite direction, each terminal for producing an output signal when the other terminal receives an input signal; and means coupled to each element for supplying an operating voltage to each element.

5. The combination, comprising:

a two-way transmission path at either end portion of which a signal may be applied for transmission along the path to the opposite end of the path; and a bidirectional amplifier in said path for amplifying the signal passing in either direction along the path comprising:

a pair of transistors of like conductivity type, each operating as an emitter follower, and each including a base electrode, an emitter electrode and a collector electrode;

a direct current connection between the emitter electrode of each transistor and the base electrode of the other transistor;

a terminal at each direct current connection, one for receiving an input signal propagating along said path in one direction and the other for receiving an input signal propagating along said path in the opposite direction, each terminal for producing an output signal when the other terminal receives an input signal; and means coupled to each transistor for supplying an operating voltage to each transistor.

References Cited by the Examiner

UNITED STATES PATENTS

| | | | |
|---|---|---|---|
| 2,262,838 | 11/1941 | Deloraine et al. | 179—170 |
| 2,806,153 | 9/1957 | Walker | 307—88.5 |
| 2,904,641 | 9/1959 | Radcliffe | 179—170 |
| 2,946,897 | 7/1960 | Mayo | 307—88.5 |
| 3,175,050 | 3/1965 | Oxman | 179—170 |

FOREIGN PATENTS

| | | |
|---|---|---|
| 542,035 | 12/1941 | Great Britain. |

ROBERT H. ROSE, *Primary Examiner.*

L. MILLER ANDRUS, *Examiner.*